United States Patent [19]

Prakash et al.

[11] Patent Number: 4,804,981
[45] Date of Patent: Feb. 14, 1989

[54] ASPHERIC LENS FOR POLYGON MIRROR TILT ERROR CORRECTION AND SCAN BOW CORRECTION IN AN ELECTROPHOTOGRAPHIC PRINTER

[75] Inventors: Ravinder Prakash, Concord, N.C.; Larry L. Wolfe, Broomfield, Colo.

[73] Assignee: International Business Machines Corporation, Armonk, N.Y.

[21] Appl. No.: 159,019

[22] Filed: Feb. 18, 1988

[51] Int. Cl.$^4$ ............................................. G01D 15/00
[52] U.S. Cl. ..................................... 346/160; 346/108
[58] Field of Search ................... 346/160, 107 R, 108; 350/6.2, 6.7, 6.8, 6.9, 6.91, 412, 432; 101/DIG. 13; 358/300

[56] References Cited

U.S. PATENT DOCUMENTS

| | | | |
|---|---|---|---|
| 3,903,218 | 9/1975 | Humphrey | 264/1 |
| 4,070,115 | 1/1978 | Humphrey | 356/125 |
| 4,180,325 | 12/1979 | Humphrey | 356/127 |
| 4,223,981 | 9/1980 | Mizutani et al. | 350/184 |
| 4,326,790 | 4/1982 | Hirata et al. | 354/288 |
| 4,351,590 | 9/1982 | Hirata et al. | 352/140 |
| 4,359,269 | 11/1982 | Itoh | 350/425 |
| 4,408,841 | 10/1983 | Arai et al. | 350/423 |
| 4,477,158 | 10/1984 | Pollock et al. | 351/169 |
| 4,506,959 | 3/1985 | Hama | 350/430 |
| 4,509,838 | 4/1985 | Iba et al. | 354/62 |
| 4,514,049 | 4/1985 | Hirano | 350/425 |
| 4,523,815 | 6/1985 | Tomori | 350/430 |
| 4,586,814 | 5/1986 | Tokuhara et al. | 355/55 |
| 4,597,650 | 7/1986 | Yoshino et al. | 351/208 |
| 4,601,545 | 7/1986 | Kern | 350/347 V |
| 4,718,752 | 1/1988 | Sprague et al. | 346/108 |
| 4,760,407 | 7/1988 | Arimoto et al. | 346/160 |

Primary Examiner—Arthur G. Evans
Attorney, Agent, or Firm—Philip J. Feig

[57] ABSTRACT

An aspheric lens exhibiting varying optical power as a function of locating along the longitudinal axis of the lens is intended for use in an electrophotographic printer of the type having a mirror for providing tilt error and scan bow error correction of a laser beam to be imaged at a photoconductor surface.

32 Claims, 6 Drawing Sheets

ASPHERIC LENS FOR POLYGON MIRROR TILT ERROR CORRECTION AND SCAN BOW CORRECTION IN AN ELECTROPHOTOGRAPHIC PRINTER

BACKGROUND OF THE INVENTION

This invention relates to laser electrophotographic printers and more specifically relates to an aspheric lens for providing improved mirror tilt error correction and scan bow correction in such printers.

Electrophotographic printers are designed to create an image by placing a series of picture elements (pels) on an image receiving material. For example, an image may be created by a light source, such as one or more lasers, which reflect from a multi-faceted or polygon mirror or galvo scanning mirror for scanning across a photoconductor surface in a succession of scan lines. The light beam or beams place a series of overlapping pels on the photoconductor surface. Each pel is placed in a pel area and the light beam is modulated so that some pel areas are exposed to light and some are not. Whenever a pel containing light strikes the photoconductor surface, the surface is discharged at that pel location. In this manner, the photoconductor surface is caused to bear a charge pattern of pels which matches the object image that is to be reproduced. The printed copy is obtained by developing the charge pattern and transferring the developed image to print material, usually paper.

Electrophotographic printers are well known in the art and are described, for instance, in U.S. Pat. No. 4,544,264 issued to Larry W. Bassetti, dated Oct. 1, 1985 and U.S. Pat. No. 4,625,222, issued to Larry W. Bassetti et al, dated Nov. 25, 1986, both assigned to the assignee of the present invention.

An inherent error associated with multi-faceted scanners is the tilt of the facet surface relative to the rotating axis. If the pitch varies from facet to facet a reflecting beam will be angularly displaced by twice the tilt angle. Uncorrected, the displacement or tilt error is typically 200 to 300 times that which is considered acceptable in electrophotographic printers.

In the prior art, conventional cylindrical optic systems have been used to provide partial correction for the tilt error. Such conventional optic systems have been limited in their ability to maintain a conjugate relationship between the facet surface and the photoconductor surface for the entire scan.

Prior systems contain tilt correcting lens. In such systems, as the laser beam scans across the photoconductor surface the distance from the polygon mirror in the photoconductor surface varies by the inverse cosine of the scan angle theta. These prior systems make use of either a wrapped toric lens or a long cylindrical lens disposed in proximity to the photoconductor surface for performing the tilt correction.

The use of constant optical power cylindrical lenses near the image plane for providing tilt correction is known. However, multispot laser printers, for example, are not amenable to constant optical power lens for providing such tilt connection. Using a constant power lens, the scan lines will bow, i.e., not be perfectly straight or flat. The bow in the scan line can be as much as 20 to 40 microns. Moreover, the magnitude and/or direction of bow in adjacent scans vary. In a typical multispot laser printer the desired spacing between lines is 50 microns. Therefore, the scan bow error effect is objectionable in high quality printing. A prior art solution to correct for tilt error by use of a constant power lens, is to bend the lens into an arc.

When using a toroidal surface lens, the lens is disposed so that the object distance, S, (from the polygon mirror to the lens) and the image distance, S', (from the lens to the photoconductor surfaces) is divided so that $1/S + 1/S' = 1/F$, where F is the focal distance of the lens. Since the arcuate lens can only approximate the ideal surface needed, a compromise is obtained. The compromise suffers as the scan angle requirements are increased.

A long straight cylindrical lens makes use of the fact that when placed in proximity to the photoconductor surface, the above equation is more closely approximated. However, the long straight cylindrical lens approach suffers to an even greater extent than the wrapped cylindrical lens approach as the scan angle requirements are increased.

The present invention provides a simpler and less expensive solution to the problems of tilt error correction and bowing of the scan lines by use of an aspheric plastic molded lens. Once a mold is manufactured, lenses for providing tilt correction in multispot printers become less expensive and simple to manufacture.

SUMMARY OF THE INVENTION

In the present invention, an aspheric lens is described which undergoes a change in the radius of curvature in a cross-section normal to the longitudinal axis along the longitudinal axis of an aspheric lens so that the focal length variation achieved along the length or longitudinal axis of the lens solves the above equation, $1/S + 1/S' = 1/F$.

The use of an aspheric lens with varying power in relation to the scan of a polygon mirror enables the laser spot to be imaged across a photoconductor surface with tilt error correction.

Furthermore, in a multiple spot printhead, the focal length is adjusted to slightly differ from an exact solution of the above equation such that the scan bow error is minimized while the tilt error is substantially corrected.

In a typical laser scanner system in which the laser beam impinges the facet at an off axis angle, there is a walking of the beam scan point of intersection with the central scan axis. The walking effect, although small, does, in fact, affect the image distance. The effect on the tilt correction performance is capable of being "nulled out" by performing an exact raytrace by known methods and varying the focal length of the aspheric lens as needed to correct for tilt error and scan bow error. Raytrace modeling of the present aspherical lens concept has shown that with sufficient decimal precision accuracy, the lens radius is capable of being selected to image the mirror surface and therefore substantially perfectly correct any pyramidal tilt errors and scan bow errors.

A principal object of the present invention is therefore, the provision of an aspheric lens with varying power along its longitudinal axis.

Another object of the present invention is the provision of an aspheric lens having varying power along its longitudinal axis such that in an electrophotographic printer having a scanning mirror and a photoconductor surface, the mirror and surface are maintained at conjugate planes to the lens during scanning for correcting tilt displacement and scan bow errors.

A further object of the invention is the provision of an aspheric lens, primarily for use in an electrophotographic printer, for correcting tilt displacement errors.

Further and still other objects of the invention will become more clearly apparent when the following description is read in conjunction with the accompanying drawings.

DETAILED DESCRIPTION

Figure 1:
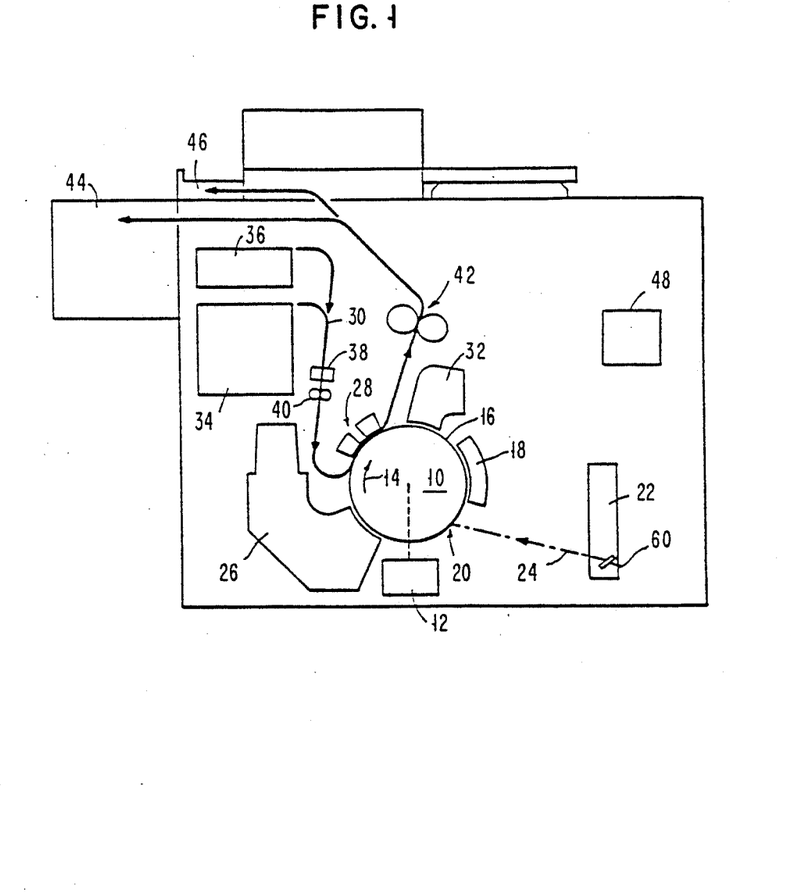
FIG. 1 is a schematic representation of a typical electrophotographic printer.

Referring now to the figures and FIG. 1 in particular, there is shown a typical electrophotographic laser printer. An electrophotographic drum 10 is driven by motor 12 in the direction of arrow 14. Drum 10 carries photoconductor material 16 which passes under a charge corona generator 18 to charge the photoconductor material to a suitable voltage. The photoconductor material is discharged at exposure station 20 according to the image to be reproduced. The image is produced by a scanning system 22 consisting of a laser printhead 40 which produces modulated laser beams 24. The latent image is developed at the developer station 26 and transferred by corona generator 28 to image receiving material (typically copy paper) traversing the paper path 30. The photoconductor material 16 continues to cleaning station 32 before continuing for receiving another image. Copy paper may be stored in either bin 34 or 36 and fed into the paper path 30 to a gate 38, through pinch rolls 40 and through transfer station 28 onto the fusing rolls 42. The finished print is then passed to an exit pocket 44 or to a finishing station 46.

Box 48 represents the control circuit for controlling the operation of the printer and may contain one or more of any suitable microprocessor.

Figure 2:
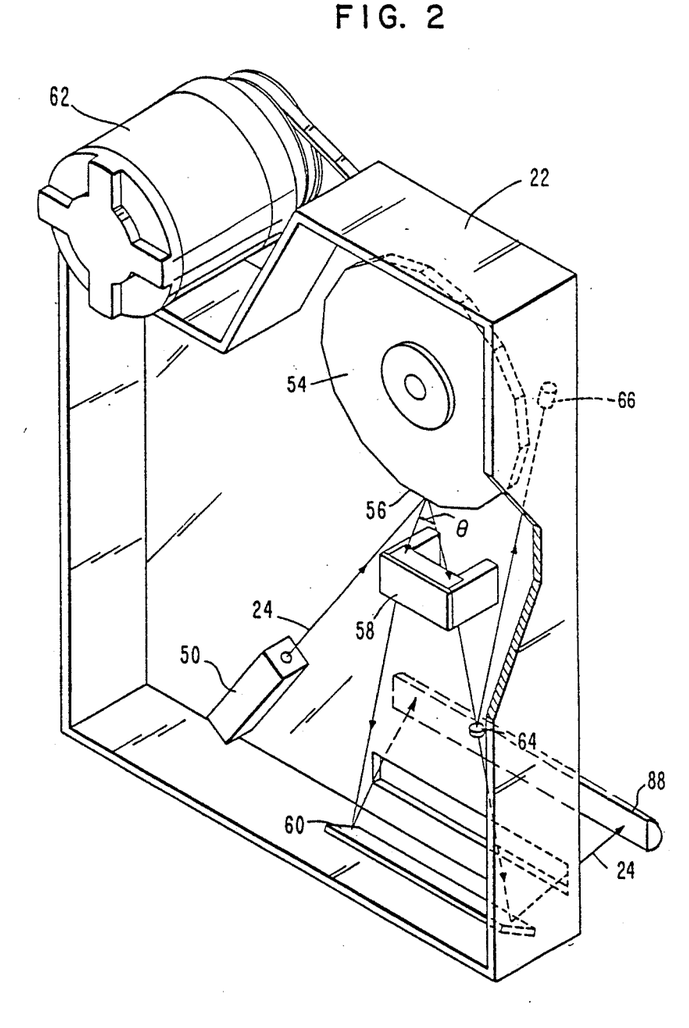
FIG. 2 is a schematic representation of a laser scanning system for use in an electrophotographic printer.

The scanning system 22 is shown in more detail in FIG. 2 where one or more solid-state laser chips and associated optics are housed in assembly 50. A plurality of laser beams 24 generated by a plurality of semiconductor lasers pass from assembly 50 to a rotating polygon mirror 54 which has a plurality of facets such as facet 56 around its periphery. The laser beams 24 are reflected from a single facet at a time in such a manner as to scan through an angle $\theta$. As the mirror rotates, each facet 56 causes the beams to scan through an angle $\theta$. After reflecting from the rotating mirror facet, the beams are passed through optical assembly 58 to shape the beam and to focus it on the photoconductor surface 16. A beam folding mirror 60 is shown illustrating the final folding mechanism to direct the laser beams 24 through aspheric lens 88 and onto the photoconductor surface 16. Motor 62 is coupled to drive the rotating mirror 54. A start-of-scan mirror 64 is provided to direct the laser beam to a start-of-scan detector 66.

Multiple spots are produced on the photoconductor surface 16 from a plurality of lasers by the reflection of the laser beams across a single facet 56 on rotating mirror 54. The quantity of spots in a scan line depends upon the quantity of lasers in assembly 50. Multiple laser output beams are optically combined to form multiple spots.

Figure 3A:
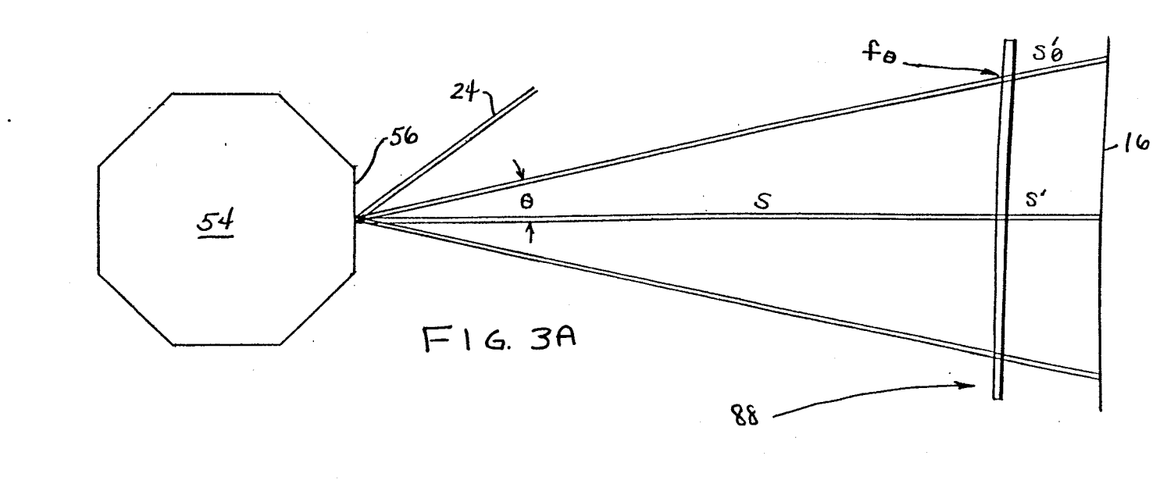
FIG. 3A is a schematic plan view of a portion of a multiple spot laser electrophotographic printer.
Figure 3B:
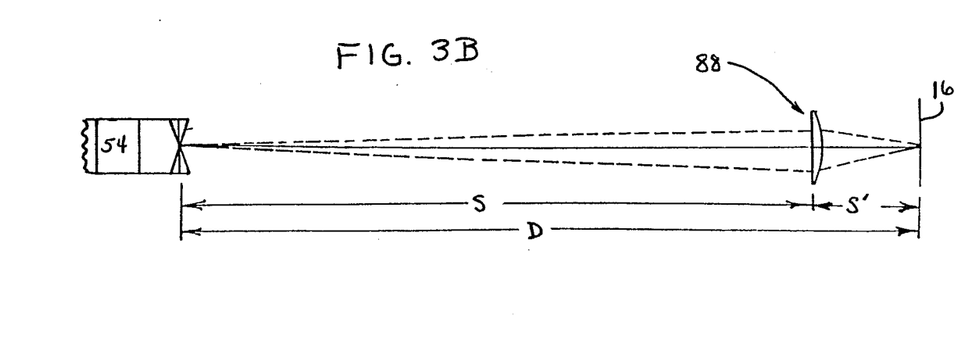
FIG. 3B is a schematic side elevational representation of the portion of the multiple spot laser electrophotographic printer in FIG. 3A.

While the printer described in conjunction with FIGS. 1 and 2 includes a folding mirror 60, it will be apparent that the laser beam may be reflected directly from rotating mirror 54 through suitable optical assembly 58 and the aspheric lens 88 directly onto the photoconductor surface 16. The lens 88 is disposed at a location in proximity to photoconductor surface 16 for causing the surface 16 to be at the conjugate plane to the facet 56. FIGS. 3A and 3B illustrate the location of the lens 88 in an arrangement which has been simplified by elimination of optical assembly 58 and mirror 60 in order to facilitate a better understanding of the invention.

In order to achieve a solution for the equation:

$$1/S + 1/S' = 1/F$$

the radius of curvature of a long straight cylindrical lens must be varied in the scan direction.

In FIG. 3A, an incoming light beam 24 is reflected from a facet 56 of polygon mirror 54 through an angle $\theta$. As seen in FIG. 3B, which is a side elevational view of the arrangement per FIG. 3A, the surface of facet 56 of mirror 54 includes a pitch or tilt error, that is the plane of each facet 56 is tilted relative to the rotational axis of the mirror 54. In FIGS. 3A and 3B, S is the object distance from the aspheric lens 88 to the scan origin at the facet 56, $\theta$ is the scan angle, D is the distance from the photoconductor surface 16 to the scan origin at the facet 56, and S' is the image distance from the lens 88 to the surface 16.

The focal length as a function of scan angle, $\theta$, is:

$$f_\theta = (S_\theta)(S'_\theta)/(S_\theta + S'_\theta)$$

substituting $$S_\theta = S/\cos \theta$$

and $$S'_\theta = (D/\cos \theta) - (S/\cos \theta)$$

results in:

$$f_\theta = \frac{(S/\cos \theta)(D/\cos \theta - S/\cos \theta)}{(S/\cos \theta) + (D/\cos \theta - S/\cos \theta)}$$

simplification yields:

$$f_\theta = (S/\cos \theta) - S^2/(D \cos \theta)$$

Figure 4:
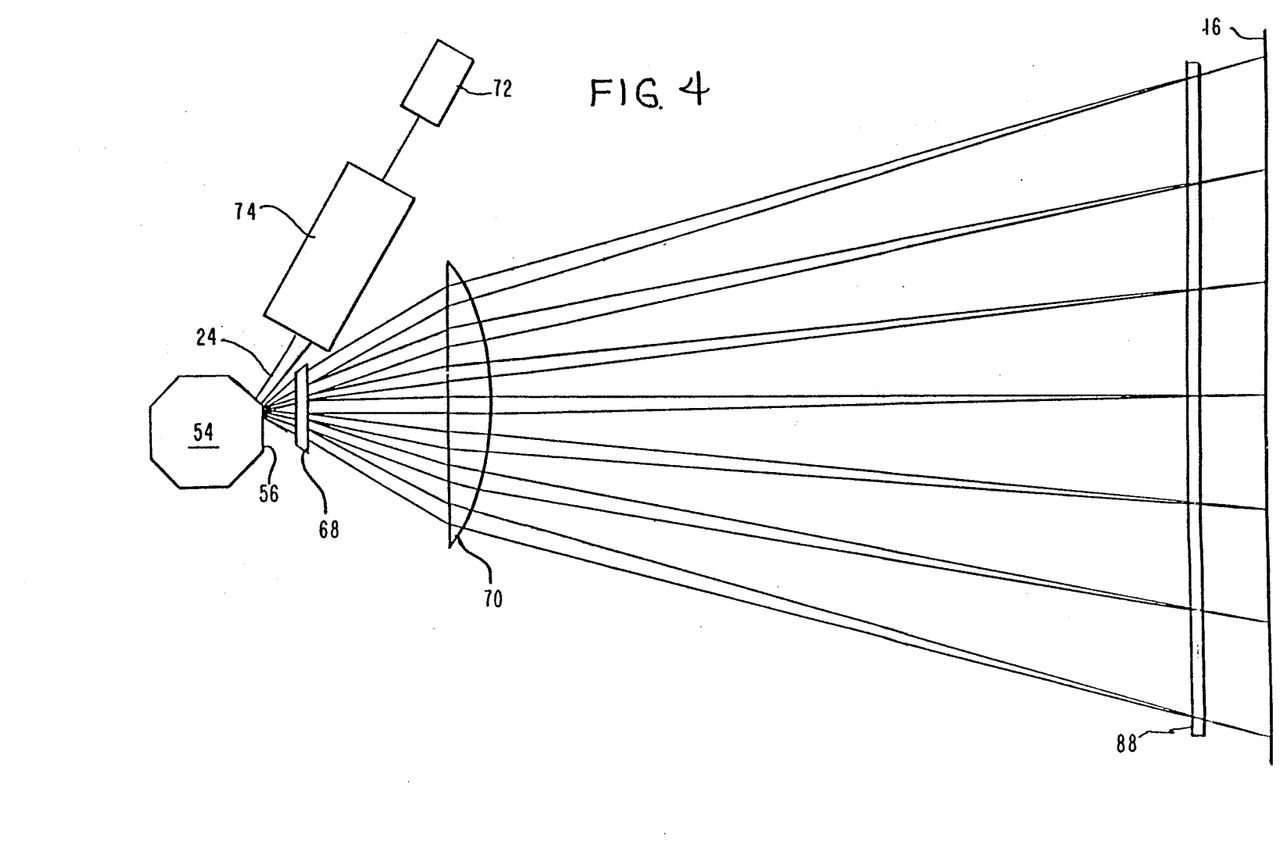
FIG. 4 is a schematic representation of a portion of the scanner of a multiple spot laser electrophotographic printer.

The above equation is applicable where the variable power aspheric lens 88 is the only element in the scanned beam path as shown in FIGS. 3A and 3B. Similar equations are derivable and computer raytrace analysis is available to determine the focal length when additional field lens elements, such as lens 68 and lens 70 are present as shown in FIG. 4. In that case, a laser source 72 emits multiple laser beams which pass through prescan optical assembly 74. The beams 24 from assembly 74 are reflected by rotating polygon mirror 54 facet 56, through lens 68 and lens 70 and through lens 88 to the photoconductor surface 16.

In a typical laser scanner system where the laser beam is incident to mirror 54 at an off-axis direction, there is a variation of the beam scan intersection (scan origin) point with the central scan axis. The effect of the scan origin variation can be eliminated by performing a raytrace of the lens as needed.

It has been demonstrated by raytrace modeling that the lens radii can be selected to image the polygon mirror facet 56 and therefore correct any pyramidal tilt error in the scanning system. Furthermore, using raytrace analysis it is possible to determine scan bow error correction in addition to tilt error correction. The lens radii and hence, lens focal length will substantially solve the above equations, with minor differences from an exact solution resulting from a trade off between tilt error correction and scan bow error correction as required. For instance, scan bow error correction becomes a more serious problem when a multiple spot scanner is used.

In one embodiment, lens 88 has been modeled in combination with a 34.5 mm radius polygon mirror and two post scan, i.e., in the region between the mirror 54 and lens 88, spherical field lenses with a combined focal length of 430 mm. Using an iterative process over selected scan angles for raytrace molding, the optimal radius of curvature for the lens 88 was determined to one micron accuracy for each of the beam intersection points on the lens. The performance of these optimal radii is shown in chart 1.

CHART 1

| SCAN ANGLE (DEGREES) | LENS INTERSECTION POINT IN SCAN DIR (MM) | LENS RADII (MM) | PROCESS DIR PLACEMENT ERROR (UM) |
|---|---|---|---|
| 12.4 | 176.46 | 21.408 | 0.00 |
| 16.6 | 117.59 | 20.640 | −0.01 |
| 20.8 | 58.76 | 20.160 | 0.00 |
| 25.0 | .06 | 20.000 | 0.00 |
| 29.2 | −58.65 | 20.168 | 0.01 |
| 33.4 | −117.53 | 20.649 | 0.01 |
| 37.6 | −176.48 | 21.403 | 0.00 |

The radius of curvature of the lens as a function of scan position x along the longitudinal axis of the lens has been fitted to a fourth order polynomial:

$$R = R_C + A(x^2) + B(x^4)$$

where Rc is the central radius, x is the scan direction beam/lens intercept point, A is $4.78 \times 10^{-5}$ and B is $-8.66 \times 10^{-11}$ for the example given above. The values A and B are determined empirically from raytracing methods or by calculating the values in order to solve the above equation for the focal length as a function of scan angle.

The performance of a lens using a radius of curvature based upon the fourth order polynomial provides displacement errors at the photoconductor surface less than one-tenth of a micron. The results of using such a lens is shown in chart 2.

CHART 2

| SCAN ANGLE (DEGREES) | LENS INTERSECTION POINT IN SCAN DIR (MM) | LENS RADII (MM) | PROCESS DIR PLACEMENT ERROR (UM) |
|---|---|---|---|
| 12.4 | 176.46 | 21.404 | −0.08 |
| 16.6 | 117.59 | 20.644 | 0.07 |
| 20.8 | 58.76 | 20.164 | 0.08 |
| 25.0 | .06 | 20.000 | 0.00 |
| 29.2 | −58.65 | 20.164 | −0.09 |
| 33.4 | −117.53 | 20.644 | −0.09 |
| 37.6 | −176.48 | 21.404 | 0.04 |

Figure 5:
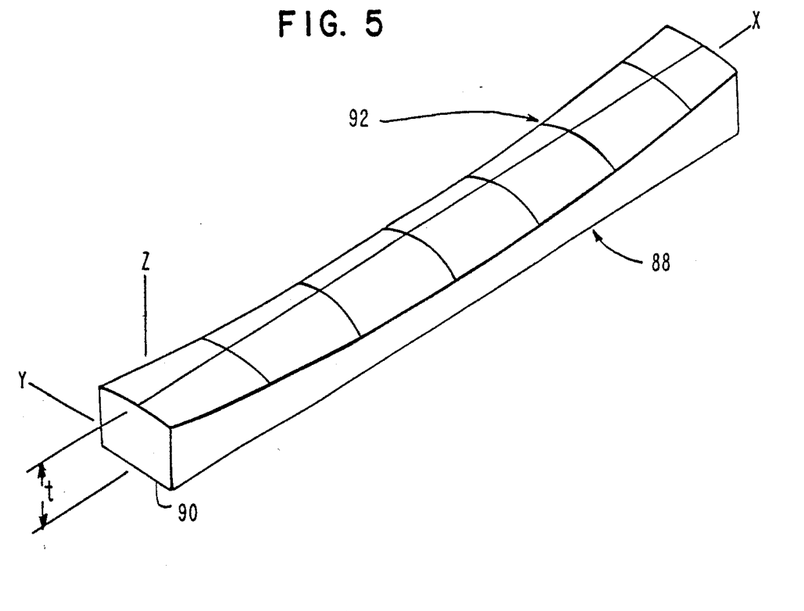
FIG. 5 is an isometric view of a lens designed in accordance with the present invention.
Figure 6:
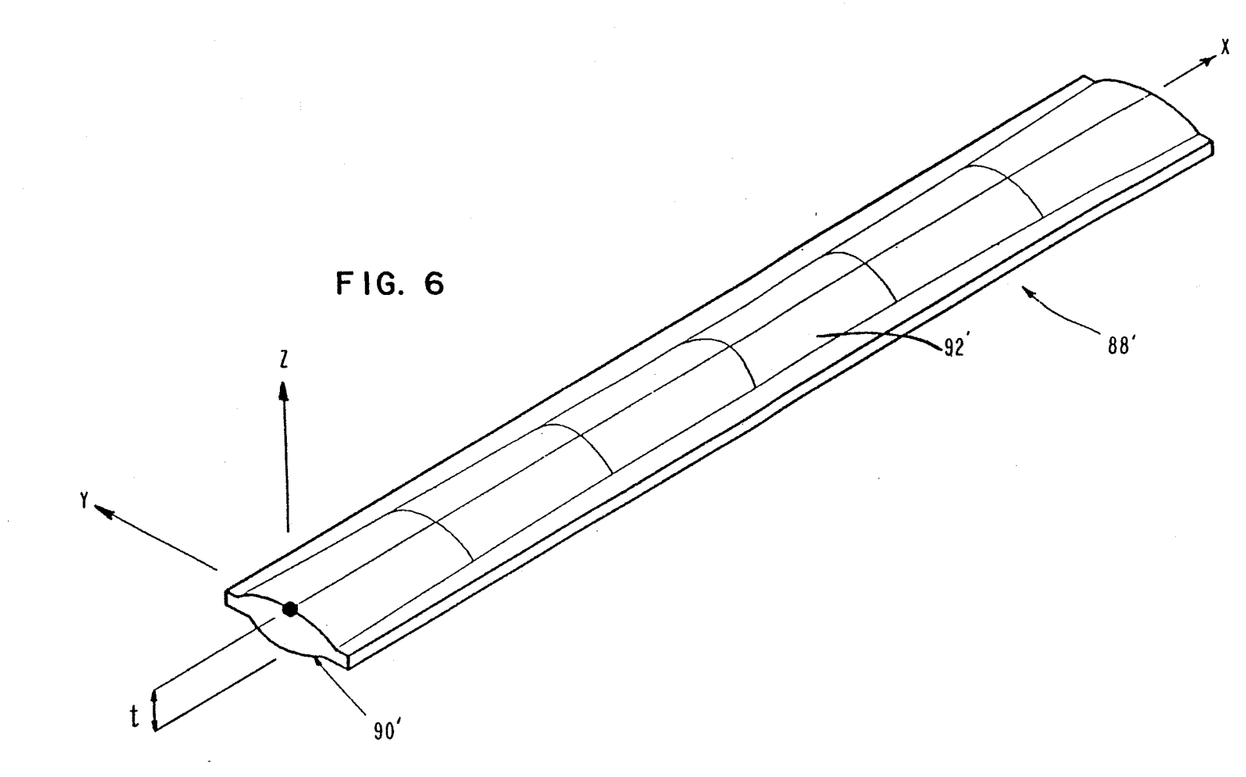
FIG. 6 is an isometric view of a preferred embodiment of a lens designed in accordance with the present invention.

FIG. 5 is a isometric representation of an aspherical variable power lens comprising the present invention. The optical power is in the Y-Z plane as shown. The vertex thickness t is constant across the length of the lens in the x-axis direction. The bottom surface 90 as shown in FIG. 5 is flat. In a preferred embodiment, the bottom surface 90' is manufactured with a constant radius of curvature as shown in FIG. 6. The radius of curvature of the top surface 92 varies at all Y-Z plane cross sections. The radius of curvature varies depending upon the location along the longitudinal axis or x-axis of the lens. At the center of the lens the radius of curvature is the smallest and increases monotonically as a function of the distance from the lens center in the X-axis direction. The radius of curvature values are defined by the equation:

$$R = R_C + R_2(x-1)^2 + R_4(x-1)^4,$$

where R is the radius of curvature in millimeters, $R_c = 27.66$, $R_2 = 0.00009471$, $R_4 = -0.0000000001018$, $1 = 185$ and x is the distance from the end of the lens for a preferred lens construction.

The preferred lens has a center radius of curvature ($R_c$) equal to 27.66 mm and located 185 mm from the origin end of the lens (left end in FIG. 5). The bottom surface 90 is flat and the vertex thickness is uniform 5 mm.

The focal length of the lens varies along the X-direction of the lens. For a light source having a wavelength of 632.8nm, the theoretical focal length as of function of X-axis position is:

$$f = f_c + f_2(x-1)^2 + f_4(x-1)^4,$$

where f is the focal length in millimeters, and for the preferred lens described above $f_c = 37.16$, $f_2 = 0.00008072$, $f_4 = -0.0000000001708$, $1 = 185$ where x is the distance from the origin end of the lens.

In a preferred embodiment of the lens 88' shown in FIG. 6, the radius of curvature of the bottom surface 90' is constant at each Y-Z plane cross section. The radius of curvature of the top surface 92' varies at each Y-Z plane cross section. In the preferred construction, the radius of curvature of surface 90' is 50mm. The vertex thickness t is constant across the length of the lens 88' in the X-axis direction. The contour of the top surface 92 of lens 88 and the top surface 92' of lens 88' are different. However, both contours are determinable from raytrace analysis or calculation in order to determine the contour of the respective surface required for providing the necessary optical power at each location along the lens for substantially eliminating tilt error and scan bow error at each scan angle θ.

The lens may be manufactured from optical glass, transparent plastic or any other material suitable for the manufacture of lens. In the present invention, methyl methacrylate, grade 'A' is the preferred material. The top and bottom surfaces may be polished so that they are optical interfaces through which light may pass and be deflected.

It will be apparent that the present lens may be formed from two portions. A first portion having a flat surface and either an oppositely disposed flat surface or an oppositely disposed surface having a constant radius of curvature. The second portion having a flat surface and a contour fitting the fourth order polynomial described above. The two flat surfaces being joined in intimate contact to form the lens.

Having described and illustrated a preferred embodiment of an aspheric variable power lens, primarily for use in an electrophotographic printer, it will be apparent to those skilled in the art that modifications and variations are possible without deviating from the scope of the invention, which shall be limited solely by claims appended hereto.

Having thus described the invention, what is claimed as new and desired to be secured by Letters Patent is as follows:

1. A tilt and scan bow error correction system for an electrophotographic printer of the type using a mirror to provide beam scanning across a photoconductor surface comprising:
   an aspheric lens disposed in the path between said mirror and said photoconductor surface so that said surface is at the conjugate plane to said mirror, said lens having a focal length as a function of scan angle, $\theta$, substantially according to the equation $$f_\theta = (S/\cos\theta) - S^2/(D\cos\theta)$$

where S is the object distance from said lens the scan origin at said mirror and D is the distance from said photoconductor surface to the scan origin at said mirror.

2. A tilt and scan bow error correction system is set forth in claim 1, wherein said lens has a radius of curvature along a first surface that varies in each cross-section in a plane normal to the longitudinal axis of said lens as a function of the location along said first surface in the direction of the longitudinal axis.

3. A tilt and scan bow error correction system as set forth in claim 2, wherein an oppositely disposed second surface of said lens has a constant radius of curvature for each cross section in a plane normal to the longitudinal axis.

4. A tilt and scan bow error correction system as set forth in claim 3, wherein the vertex thickness of said lens is constant.

5. A tilt and scan bow error correction system as set forth in claim 2, wherein an oppositely disposed second surface of said lens has a flat surface.

6. A tilt and scan bow error correction system as set forth in claim 5, where the vertex thickness of said lens is constant.

7. A tilt and scan bow error correction system as set forth in claim 2, wherein the radius of curvature along said first surface varies as a function of distance, x, along the longitudinal axis from one end of said lens substantially according to the equation $$R = R_c + R_2(x-1)^2 + R_4(x-1)^4$$

where $R_c$ is the radius of curvature at the center of the lens, 1 is the distance from the end of the lens to the center of the lens, $R_2$ and $R^4$ are constants.

8. A tilt and scan bow error correction system as set forth in claim 4, said lens being molded plastic material.

9. A tilt and scan bow error correction system as set forth in claim 8, said plastic material being methyl methacrylate.

10. A tilt and scan bow error correction system as set forth in claim 1, further comprising a field optical assembly disposed in the path between said mirror and said lens.

11. A multiple spot laser electrophotographic printer for projecting an object image onto a photoconductor surface including lens means for transmitting a light beam responsive to an object image, prescan optical system for projecting the light beam onto a mirror means whereat the beam is reflected to the photoconductor surface comprising:
    an aspheric lens disposed in the path between said mirror and said photoconductor surface, said lens having a focal length as a function of scan angle, $\theta$, substantially according the equation:

$$f_\theta = (S/\cos\theta) - S^2/(D\cos\theta)$$

where S is the object distance from said lens to the scan origin at said mirror and D is the distance from said photoconductor surface to the scan origin at said mirror.

12. A multiple spot laser electrophotographic printer as set forth in claim 11, wherein said lens has a radius of curvature along a first surface that varies in each cross section normal to the longitudinal axis of said lens as a function of the location along said first surface in the direction of the longitudinal axis.

13. A multiple spot laser electrophotographic printer as set forth in claim 12, wherein an oppositely disposed second surface of said lens has a constant radius of curvature at each cross section in a plane normal to the longitudinal axis.

14. A multiple spot laser electrophotographic printer as set forth in claim 13, wherein the vertex thickness of said lens is constant.

15. A multiple spot laser electrophotographic printer as set forth in claim 12, wherein an oppositely dispose second surface of said lens has a flat surface.

16. A multiple spot laser electrophotographic printer as set forth in claim 15, wherein the vertex thickness of said lens is constant.

17. A multiple spot laser electrophotographic printer as set forth in claim 12, wherein the radius of curvature along said first surface varies as a function of distance, x, along the longitudinal axis from one end of said lens substantially according the equation:

$$R = R_c + R_2(x-1)^2 + R_4(x-1)^4$$

when $R_c$ is the radius of curvature at the center of the lens, 1 is the distance from the end of the lens to the center of the lens, and $R_2$ and $R_4$ constants.

18. An aspheric variable power lens comprising:
    a first surface having a radius of curvature at each cross section in a plane normal to the longitudinal axis of the lens that varies as a function of the location along said first surface in the direction of longitudinal axis substantially according to the equation:

$$R = R_c + R_2(x-1)^2 + R_4(x-1)^4$$

where $R_c$ is the radius of curvature at the center of the lens, 1 is the distance from the end of the lens to the center of the lens, and $R_2$ and $R_4$ are constants, and a second surface disposed opposite the said first surface, the vertex thickness of the lens between said first and second surface being constant, said second surface having a constant radius of curvature at each cross-section in a plane normal to the longitudinal axis of the lens.

19. A lens as set forth in claim 18, wherein said second surface is flat.

20. A lens as set forth in claim 18, said lens being molded from plastic material.

21. A lens as set forth in claim 20, said plastic material being methyl methacrylate.

22. A lens as set forth in claim 18, said lens comprising two portions, a first portion containing said first surface and an oppositely disposed third surface, and a second portion containing said second surface and an oppositely disposed fourth surface, said third surface and said forth surface being configured for being joined in intimate contact.

23. An electrophotographic printer comprising: drive means, movable carrier means driven by said drive means;

photoconductor material mounted on said movable carrier means for cyclic movement through electrophotographic process stations;

charge corona means located at a first station for placing a relatively uniform electrostatic charge on the surface of said photoconductor material;

scanning means for providing at least one optical beam commensurate with an image to be produced;

exposure means located at a second station for selectively discharging the charged photoconductor material responsive to said at least one optical beam to cause the formation of a latent image on said photoconductor material;

developer means located at a third station for developing said latent image to produce a developed image;

image receiving material;

transfer means located at a fourth station for transferring said developed image from said photoconductor material to said image receiving material;

storage means for holding a supply of image receiving material;

a finishing station;

paper forwarding means for serially moving image receiving material from said storage means through said transfer station to said finishing station, and control means for controlling said drive means, said charge corona means, said exposure means, said developer means and said transfer means.

24. An electrophotographic printer as set forth in claim 23, wherein said scanning means comprises at least one laser means.

25. An electrophotographic printer as set forth in claim 24, wherein said laser means comprises a solid-state laser chip.

26. An electrophotographic printer as set forth in claim 24, wherein scanning means comprises an aspheric lens.

27. An electrophotographic printer as set forth in claim 26, wherein said aspheric lens has a radius curvature along a first surface that varies in each cross-section in a plane normal to the longitudinal axis of said lens as a function of the location along said first surface in the direction of the longitudinal axis.

28. An electrophotographic printer as set forth in claim 27, wherein an oppositely disposed second surface of said lens has a constant radius of curvature for each cross section in a plane normal to the longitudinal axis.

29. An electrophotographic printer as set forth in claim 28, wherein the vertex thickness of said lens is constant.

30. An electrophotographic printer as set forth in claim 29, wherein said lens is molded plastic material.

31. An electrophotographic printer as set forth in claim 30, wherein said plastic material is methyl methacrylate.

32. An electrophotographic printer as set forth in claim 23, wherein said scanning means comprises an aspheric lens.

* * * * *